Aug. 2, 1960 R. B. HANER, JR 2,947,814

CARRIER TRANSMITTER

Filed Dec. 27, 1957

INVENTOR.

R. B. HANER JR.

BY Forest B. Hitchcock

HIS ATTORNEY 2,947,814

CARRIER TRANSMITTER

Robert B. Haner, Jr., Scottsville, N.Y., assignor to General Railway Signal Company, Rochester, N.Y.

Filed Dec. 27, 1957, Ser. No. 705,593

8 Claims. (Cl. 178—66)

Figure 1:
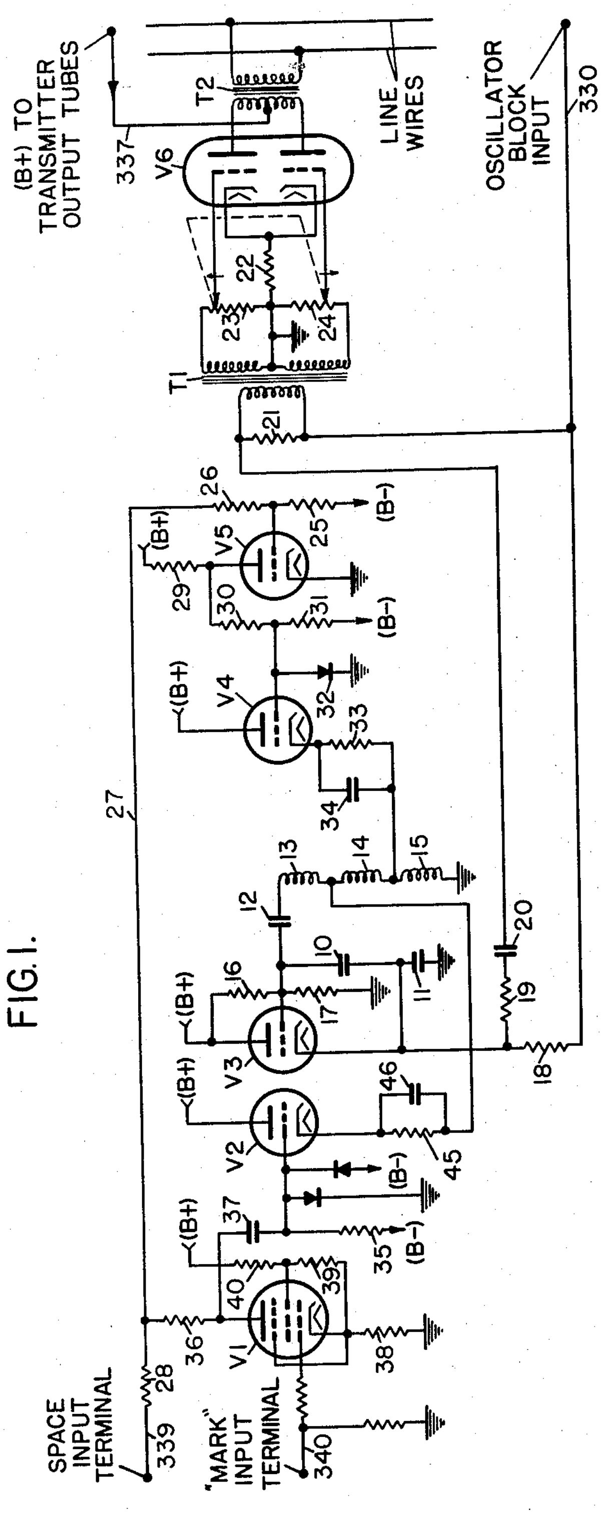

This invention relates to a carrier transmitter and more particularly pertains to a carrier transmitter for use with a code pulse communication system.

Various systems have been devised whereby intelligence may be communicated between spaced locations by transmitting code pulses between such locations either by way of space radio or over connecting line wires. One such system involves the transmission of distinctive pulses which may be either of two kinds designated, respectively, for convenience as "marks" or "spaces." Such a system is disclosed in Pat. No. 2,794,179 issued May 28, 1957, to H. C. Sibley and assigned to the same assignee as the present application. The communication system disclosed in this prior patent particularly relates to a system providing for the centralized traffic control of a stretch of railway track. With this communication system, it is possible to receive at a central office information as to the operated conditions of the various track switches and signals as well as track occupancy conditions and other information from each of a plurality of field stations.

This prior patent discloses that a single pulse period in the code transmitted from a particular station to the central office may be allocated to the transmission of indication information as to a particular device at that field station, and on that pulse period either the mark or space pulse may be transmitted. For example, if a particular track switch is in the normal position, a mark code pulse may be transmitted from that field station to the central office on a particular designated pulse period. On the other hand, if the track switch is in the reverse position, a space pulse may be transmitted on that pulse period.

Although the Sibley Pat. No. 2,794,179 does not disclose in detail the circuit organization for a carrier transmitter, it does disclose the general function of such a transmitter. The carrier transmitter is thus disclosed as being effective to apply code pulses of carrier energy to the line wires only during the particular station period designated for that station. As disclosed in Fig. 3 of the Sibley patent, it is shown, for example, that if the nominal carrier frequency for an indication code is 11 kilocycles per second, then a mark pulse is created by the transmission of a frequency somewhat below this nominal 11 kc. frequency (such as 10.75 kc.), and a frequency somewhat above this (such as 11.25 kc.) is used for the transmission of a space pulse. From this same Fig. 3 of the prior Sibley patent, it is also evident that the distinctive pulse of carrier frequency is transmitted only on the first half of any particular pulse period; the second half is used as a waiting period to separate the successive transmissions. The carrier transmitter is disclosed in this prior patent as being so organized that the nominal carrier frequency is never transmitted. In other words, no energy is applied to the line wires on the second half of each pulse period.

Experience has shown, however, that discrimination against low level noise is improved appreciably at the receiving end if a signal is continually received from the transmitter. The reason for this is that the receiver gain increases to a maximum when no signal is received so that any noise picked up receives considerable amplification. For this reason, the carrier transmitter of the present invention is so organized that it will normally transmit the nominal carrier frequency whenever that particular field station is being gated to transmit its indication code. Also, on the first half of each pulse period, the frequency of the transmitter is shifted to a value which is either somewhat above or somewhat below the nominal carrier frequency, thereby causing either a space or a mark, respectively, to be transmitted.

The carrier transmitter of this invention is organized to produce the mark and space output pulses in response to two separate gating inputs. A gating pulse applied to only one input causes a space pulse to be transmitted; whereas a gating pulse appearing concurrently on both inputs causes a mark pulse to be transmitted. With no pulse on either input, the nominal, center carrier frequency is transmitted. The carrier transmitter is thus directly usable within the organization shown in Fig. 8A of the Pat. No. 2,794,179.

It is thus an object of this invention to provide a carrier frequency transmitter having two gating inputs and being so organized that it will transmit its predetermined center frequency when no input is received over either of the input wires, will transmit a shift frequency above the nominal carrier frequency when an input is present on only one gate, and will transmit a shift frequency below the nominal carrier frequency when a gating voltage is present on both input gates.

It is a further object of this invention to provide a carrier transmitter having improved means for shifting its frequency alternatively above and below its nominal output frequency.

Other objects, purposes, and characteristic features of the present invention will in part be obvious from the accompanying drawings and in part pointed out as the description of the invention progresses.

In describing this invention in detail, reference will be made to the accompanying drawings in which:

Fig. 1 is a circuit diagram of the carrier transmitter; and

Figure 2:
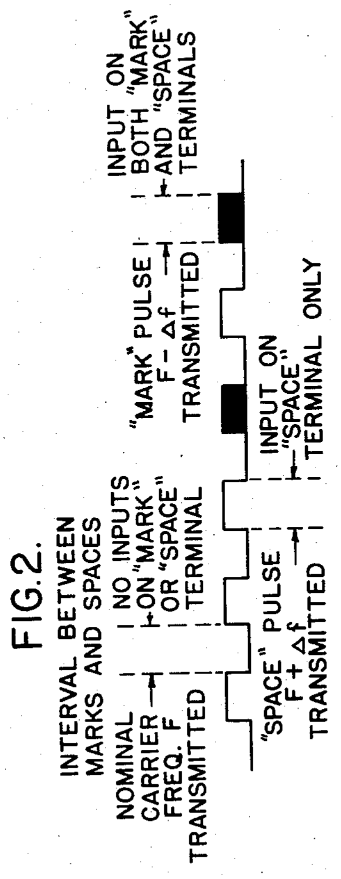

Fig. 2 diagrammatically illustrates how the transmitter is organized to respond to the selective gating inputs.

To simplify the illustrations and facilitate in the explanation of this invention, the various parts and circuits have been shown diagrammatically and certain conventional illustrations are used. The drawings have been made to make it easy to understand the principles and manner of operation of this invention rather than to illustrate the specific construction and arrangement of parts that would be used in practice. The various tubes and their elements and all other circuit components have been shown in conventional form. The symbols (B+) and (B−) represent connections to the opposite terminals of a source of energy suitable for the control of the various electron tubes shown, and the symbol for a ground connection represents a voltage level intermediate between that of (B+) and (B−).

In Fig. 1, which shows a circuit diagram of the carrier transmitter of this invention, tube V3 is the oscillator tube. This particular type of oscillator is commonly known as a Clapp oscillator with the positive feedback required for sustained oscillations being provided by a tuned circuit connected between the grid and ground and thus to the cathode. The tuned circuit includes the series-connected capacitors 10 and 11 that are connected in parallel with another series circuit comprising tuning capacitor 12 and inductors 13, 14, and 15. A positive bias voltage is provided for the control grid of this tube by means of its connection to the junction of resistors 16 and 17 connected in series from (B+) to ground.

Wire 330 over which the oscillator blocking voltage is applied to the carrier transmitter is normally at about ground potential. This wire 330, as well as the other inputs to the carrier transmitter are, incidentally, provided with the same reference characters as shown in Fig. 8A of the prior Sibley Patent No. 2,794,179 for the carrier transmitter 33 shown there. Since wire 330 is nearly at ground potential, substantially all of the oscillator output voltage appearing across capacitor 11 appears also across the cathode resistor 18. Thus there is a flow of current also through resistor 19 and coupling capacitor 20 to the primary winding of transformer T1. As a result, there is induced in the primary winding of this transformer an alternating-current voltage whose frequency is dependent upon the frequency of operation of the oscillator including tube V3. The resistor 21 connected in parallel with the primary winding has the effect of attenuating the transient voltages that would ordinarily tend to be induced in the primary winding upon the leading and trailing edge of each code pulse.

The alternating voltage appearing across the secondary winding of transformer T1 is amplified by a push-pull power amplifier that includes the dual triode amplifier tube V6. The cathodes of both halves of V6 are connected through cathode biasing resistor 22 to ground. The secondary winding of transformer T1 has its center tap also connected to ground. The two potentiometers 23 and 24 are connected in series between the upper and lower terminals of the secondary winding and their junction is grounded also. The control grid of the upper half of tube V6 is connected to the movable tap on potentiometer 23; whereas, the control grid of the lower half of this same tube is connected to the tap on the potentiometer 24. As indicated by the dotted lines connecting the two movable taps of the potentiometers 23 and 24, these movable taps are ganged together in such a manner that movement of the tap on potentiometer 23 upwardly at the same time produces a corresponding movement downward with respect to the tap on potentiometer 24. In this way, it is possible to vary the grid driving voltage for both halves of tube V6 with a single control and yet produce with such single control an equal variation in grid driving voltage on both halves of the tube.

The plates of both halves of tube V6 are connected to the opposite terminals of the primary winding of a transformer T2. The required plate operating potential for these tubes is provided over wire 337 to the center tap of the primary winding of transformer T2. As is clear from the description given in the prior Sibley patent with respect to Fig. 8A of that patent, the (B+) potential is normally present on wire 337 so that the power output stage including tube V6 is normally effective to amplify the oscillator frequency received through transformer T1. The output voltage of the push-pull amplifier is transformer-coupled from the plate circuits of the two halves of tube V6 to the secondary winding of transformer T2 which is connected directly to the line wires.

Control of the frequency of operation of the oscillator including tube V3 is obtained by, in effect, varying the amount of inductive reactance provided by the inductance present in the tuned circuit connecting the grid of this tube to ground. Thus, the greater the amount of inductance in the tuned circuit, the lower is the resonant frequency of the tuned circuit and thus the lower the frequency of operation of the oscillator. As will presently be shown, with no gating voltages present on either the space or mark input terminals 339 and 340, respectively, the inductance 15 in the grid circuit of tube V3 is effectively shunted out of the tuned circuit. Under such circumstances, the value of capacitance of capacitor 12 is then so adjusted that the oscillator will operate at the predetermined nominal carrier frequency. The effective shutting out of the inductance 15 is, in fact, accomplished by causing tube V4 to be normally conductive so that it acts as a low impedance shunt across this inductance 15, thereby making it ineffective as a tuning element.

As will be shown, the placing of a positive gating voltage on the wire 339 but not on wire 340 causes normally nonconductive tube V2 to become conductive, thereby shunting both inductances 15 and 14. This produces a decrease in the effective inductance of this circuit so that the frequency of operation of the oscillator is increased. On the other hand, the appearance of positive gating voltages on both input wires 339 and 340 concurrently permits tube V2 to remain nonconductive and causes tube V4 to become nonconductive. The nonconduction of both tubes V2 and V4 has the effect of causing both inductances 14 and 15 to be unshunted. This increases the effective inductance in the tuned circuit above what is normally present with no gating inputs applied. Consequently, the oscillator then produces an output frequency which is somewhat below the nominal carrier frequency. In the embodiment of the invention disclosed here, variation in oscillator frequency is accomplished by varying the effective inductance in the tuned circuit. This function could also, of course, be accomplished by varying the capacitance of the tune circuit.

Control over the conduction of tube V4 is exercised by tube V5. This amplifier tube V5 is normally cut off because its control grid is connected through a resistor 25 to (B−). The control grid is connected also through another resistor 26 to wire 27 and then through resistor 28 to the input wire 339 to which the space input pulses are selectively applied. With tube V5 normally cut off, its plate voltage is at substantially the (B+) level because there is no flow of plate current through its plate load resistor 29. This plate voltage is applied through a resistor 30 to the control grid of tube V4 and tends to overcome the negative bias voltage that this tube would ordinarily receive by the connection of its control grid through resistor 31 to the (B−) source. Thus, with tube V5 in its normal nonconductive state, tube V4 is fully conductive. The control grid of tube V4 is prevented from rising in potential above ground by the connection of the rectifier 32 from the grid to ground.

When tube V4 is conductive, there is a flow of current through cathode resistor 33 to the upper terminal of inductance 15 and then to ground. Resistor 33 provides the required grid bias for tube V4 so as to limit its plate-cathode current. The parallel capacitor 34 by-passes resistor 33 with respect to the oscillator frequency so as to provide a low impedance shunt path for such frequencies when tube V4 conducts. As already explained, this has the effect of providing a low impedance shunt around inductance 15 so that it is substantially ineffective in determining the frequency of operation of the oscillator.

With no gating voltage present on wire 339, the grid voltage of tube V2 is determined entirely by the voltage that is applied to this grid from (B−) through resistor 35, and this voltage is sufficiently negative with respect to the cathode to cause this tube to be fully cut off. Tube V2 thus acts as a very high impedance shunt with respect to inductances 14 and 15 so that it has no substantial effect upon them.

The conditions described above where only inductance 15 is shunted is that resulting when no gating inputs appear on either wires 339 and 340. Therefore, this represents the condition in the code transmission cycle when there is an interval between successive marks and spaces as shown in Fig. 2. Assuming now, however, that a positive gating voltage appears on wire 339 but not on the mark input terminal corresponding to wire 340 then, according to Fig. 2, a space pulse should be transmitted with a frequency higher than the nominal carrier frequency. This can readily be accomplished because a positive gating voltage on wire 339 is applied through resistor 28 and through resistor 36 to the plate of tube V1. There is then a quick charging of capacitor 37 which tends to covercome the negative cut-off bias normally effective on the grid of this tube so that tube V2 can conduct. The plate-cathode current of tube V2 passes through the cathode biasing resistor 45 and through both inductances 14 and 15. By-pass capacitor 46 has the same function as previously described in connection with capacitor 34. This has the effect of shunting both of these inductances out of the oscillator tuned circuit so that the overall inductance of such tuned circuit is decreased and the frequency of operation of the oscillator is thereby increased. As a side effect, the positive gating voltage that then appears on wire 27 also causes tube V5 to conduct so that its normally high plate voltage is substantially reduced. This permits tube V4 to become cut off so that this tube no longer acts as a low impedance shunt with respect to inductance 15. This action is of little consequence at this time, however, because the conduction of tube V2 is providing the necessary shunting of both inductances 14 and 15 as described above.

To transmit a mark pulse, positive gating voltages must appear concurrently on wires 339 and 340. The positive gating voltage on wire 339 has the effect just described of making tube V4 nonconductive so as to remove the shunting effect on inductance 15. At the same time, the positive gating voltage on wire 339 is applied through resistors 28 and 36 to the plate of tube V1. This time, however, the control grid of tube V1 is made sufficiently positive by the gating input present on wire 340 with respect to the positively biased cathode so that this tube will conduct. The cathode of this tube V1 receives its positive bias from being connected to the junction of voltage dividing resistors 38 and 39 while the upper terminal of resistor 39 is connected through resistor 40 to the (B+) terminal. This voltage divider also provides the required screen grid voltage; the suppressor grid is connected directly to the cathode.

The gating of the control grid of tube V1 while a positive plate potential is provided for this tube from wire 339 permits this tube to conduct with the result that there is then a relatively low impedance existing from this plate to the ground. Consequently, the voltage at the plate of tube V1 cannot rise substantially above ground potential so that tube V2 remains cut off. There can then be no shunting provided by tube V2 with respect to inductances 14 and 15. Under these circumstances, therefore, both inductances 14 and 15 are effective in the tuned circuit so that the frequency of operation of the oscillator is lowered below its nominal value.

An additional input terminal for the carrier transmitter is shown and designated as the "oscillator block input." As previously described and as fully disclosed in the prior Sibley Pat. No. 2,794,179, the wire 330 is normally at or near ground potential. However, at those times when the associated field station is desired to be inactive so that other stations can transmit, a positive blocking voltage is applied to wire 330. This positive voltage is applied through the resistor 18 to the cathode of oscillator tube V3 and so raises the potential of this cathode that tube V3 becomes cut off. There is then no oscillator output voltage applied to the power amplifier stage so that no signal is impressed by the carrier transmitter upon the line wires.

Having described an improved carrier transmitter for a code pulse communication system as one specific embodiment of this invention, I desire it to be understood that various forms, modifications, and adaptations may be made thereto without in any manner departing from the spirit or scope of this invention.

What I claim is:

1. In a carrier frequency transmitter organization having preselected different frequencies of operation, an oscillator having a frequency-determining resonant circuit comprising a plurality of series-connected inductors, first and second input terminals having gating voltages selectively applied thereto, first electron tube circuit means being normally effective to shunt a respective one of said inductors but acting in response to a gating voltage applied to one of said input terminals to remove said shunt, a second electron tube circuit means being rendered effective only in response to a gating voltage applied to said one input terminal to shunt a second of said inductors and also said one inductor normally shunted by said first electron tube circuit means, and means governed by the application of a gating voltage applied to the other of said input terminals to render said second electron tube circuit means nonresponsive to said gating voltage applied to said one input terminal, whereby the selective application of said gating voltages to said one input terminal and to both said input terminals respectively increases and decreases the frequency of operation of said oscillator as compared to its normal frequency of operation when gating voltages are applied to neither of said input terminals.

2. In a frequency shift transmitter for generating code pulses of distinctive frequencies, an oscillator having a preselected normal frequency of operation, a pair of input terminals having gating voltages selectively applied thereto, first frequency shifting circuit means being effective in response to a gating voltage applied to one of said input terminals to decrease the frequency of said oscillator below said normal value, second frequency shifting circuit means being effective in response to a gating voltage applied to said one input terminal to increase the frequency of operation of said oscillator and to nullify the effect of said first frequency shifting circuit means on the frequency of said oscillator, and circuit means responsive to a gating voltage applied to the other of said input terminals to render said second frequency shifting circuit means nonresponsive to the gating voltage applied to said one input terminal, whereby the application of said gating voltage to said one input terminal only produces an increase in said oscillator frequency and the application of said gating voltages to both input terminals produces a decrease in said oscillator frequency.

3. In a carrier frequency transmitter organization, an oscillator including a frequency-determining resonant circuit comprising a plurality of inductances, a first control tube being normally conductive to thereby provide a low impedance shunt across one of said inductances, a second control tube being normally nonconductive but being effective when rendered conductive to provide a low impedance shunt across another of said inductances, a first input terminal and a second input terminal, circuit means governed by the application of a gating voltage to said first input terminal to render said first control tube nonconductive and said second control tube conductive, a third control tube associated with said second control tube and being rendered conductive by the application of a gating voltage to said second input terminal, said third control tube when rendered conductive being effective to prevent said second control tube from becoming conductive in response to the gating voltage applied to said first input terminal, whereby different amounts of inductances are effective in said tuned circuit and establish respectively different frequencies of operation of said oscillator in accordance with whether said gating input voltages are applied to only said first input terminal, to both said input terminals or to neither of said input terminals.

4. In a frequency shift carrier transmitter, an oscillator including a plurality of tuning reactances, a first normally conductive control tube being effective when conductive to shunt a corresponding one of said tuning reactances, a second normally nonconductive control tube being effective when rendered conductive to shunt a second of said tuning reactances, a first input terminal, first circuit means responsive to the application of a gating voltage to said first input terminal to make said first control tube nonconductive and said second control tube conductive, a second input terminal, and second circuit means being governed by the application of a gating voltage to said second input terminal to prevent the voltage on said first input terminal from making said second control tube conductive, and means associated with said oscillator for amplifying its output frequency and applying the amplified output signal to a pair of line wires, whereby gating voltages may selectively be applied to said first input terminal or to both said input terminals or to neither of said input terminals to provide respectively different amounts of reactance associated with said oscillator to thereby vary its frequency of operation.

5. A frequency shift carrier transmitter comprising, an oscillator having its generated frequency dependent upon a plurality of tuned reactances, and electronic means having two input terminals and including circuit means using electronic tubes for selecting different combinations of said reactances to be effective in said oscillator in response to the energization selectively of one or the other of said input terminals or the deenergization of both of said input terminals.

6. A frequency shift carrier transmitter according to claim 5 wherein said electronic means includes a first electronic tube which is normally conductive without energization of either of said input terminals, and when conductive said first electronic tube shunts a particular one of said reactances, said first electronic tube being rendered nonconductive in response to energization of a particular one of said input terminals.

7. A frequency shift carrier transmitter according to claim 6 wherein said electronic means includes a second electronic tube which is rendered conductive in response to energization of said particular one of said input terminals, and which is effective when rendered conductive to shunt another of said reactances.

8. A frequency shift carrier transmitter according to claim 7 wherein said electronic means includes a third electronic tube which is rendered conductive in response to the energization of the other of said input terminals and which is effective when rendered conductive to prevent said second electronic tube from becoming conductive.

References Cited in the file of this patent

UNITED STATES PATENTS

| | | |
|---|---|---|
| 1,661,962 | Robinson | Mar. 6, 1928 |
| 2,033,948 | Lowell | Mar. 17, 1936 |
| 2,036,319 | Case | Apr. 7, 1936 |
| 2,037,159 | Dyksterhuis | Apr. 14, 1936 |
| 2,539,829 | Clark | Jan. 23, 1951 |